US011341298B2

(12) United States Patent
Isaev et al.

(10) Patent No.: US 11,341,298 B2
(45) Date of Patent: May 24, 2022

(54) METHOD FOR RESERVOIR STIMULATION ANALYSIS AND DESIGN BASED ON LAGRANGIAN APPROACH

(71) Applicant: SCHLUMBERGER TECHNOLOGY CORPORATION, Sugar Land, TX (US)

(72) Inventors: Vadim Ismailovich Isaev, Novosibirsk (RU); Dmitry Sergeevich Kuznetsov, Novosibirsk (RU); Ivan Vladimirovich Velikanov, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 169 days.

(21) Appl. No.: 16/770,142

(22) PCT Filed: Dec. 5, 2017

(86) PCT No.: PCT/RU2017/000972
§ 371 (c)(1),
(2) Date: Jun. 5, 2020

(87) PCT Pub. No.: WO2019/112469
PCT Pub. Date: Jun. 13, 2019

(65) Prior Publication Data
US 2021/0173972 A1 Jun. 10, 2021

(51) Int. Cl.
*G06G 7/48* (2006.01)
*G06F 30/20* (2020.01)
(Continued)

(52) U.S. Cl.
CPC ............ *G06F 30/20* (2020.01); *E21B 43/267* (2013.01); *G06F 17/11* (2013.01); *G06F 2111/10* (2020.01)

(58) Field of Classification Search
CPC ...... G06F 30/20; G06F 2111/10; G06F 17/11; E21B 43/267
(Continued)

(56) References Cited

U.S. PATENT DOCUMENTS 6,876,959 B1   4/2005  Peirce et al.
7,451,812 B2   11/2008 Cooper et al.
(Continued)

FOREIGN PATENT DOCUMENTS

WO   2008093264 A1   8/2008
WO   2012058028 A1   5/2012
WO   2012090175 A2   7/2012

OTHER PUBLICATIONS

Chen et al., "Reaction-Transport Simulation of Matrix Acidizing and Optimal Acidizing Strategies", SPE 37282, Society of Petroleum Engineers, 1997, pp. 679-682.
(Continued)

*Primary Examiner* — Andre Pierre Louis

(57) ABSTRACT

A method of stimulating a subterranean formation includes acquiring stimulation treatment input data, simulating a transport of at least one material transport present in a stimulation treatment design with a transport simulator model, determining and preparing the treatment design and performing the stimulating treatment according to the selected treatment design. As recited, simulating includes assuming that for each time stage of the stimulation treatment a velocity field for the at least one material transport and a stimulated flow domain geometry are known and calculating at each time stage the distribution of at least one physical quantity of the at least one material transport using a Lagrangian approach.

13 Claims, 9 Drawing Sheets

(51) Int. Cl.
*E21B 43/267* (2006.01)
*G06F 17/11* (2006.01)
*G06F 111/10* (2020.01)

(58) Field of Classification Search
USPC .................................................... 703/9, 10
See application file for complete search history.

(56) References Cited

U.S. PATENT DOCUMENTS

| | | | |
|---|---|---|---|
| 8,061,424 | B2 | 11/2011 | Willberg et al. |
| 9,367,653 | B2 * | 6/2016 | Madasu ................. G06F 30/23 |
| 10,544,667 | B2 | 1/2020 | Wu et al. |
| 10,605,060 | B2 | 3/2020 | Chuprakov et al. |
| 10,954,757 | B2 * | 3/2021 | Shetty .................... E21B 41/00 |
| 2008/0183451 | A1 | 7/2008 | Weng et al. |
| 2018/0252627 | A1 * | 9/2018 | Anschutz .............. G01N 11/04 |

OTHER PUBLICATIONS

Fredd CN and Fogler HS, "Influence of transport and reaction on wormhole formation in porous media", AIChE Journal, Sep. 1998, vol. 44, No. 9, pp. 1933-1949.

Gdanski, "A Fundamentally New Model of Acid Wormholing in Carbonates", SPE 54719, Society of Petroleum Engineers, 1999, 10 pages.

Geertsma et al., "A Rapid Method of Predicting Width and Extent of Hydraulically Induced Fractures", SPE 2458, Journal of Petroleum Technology, Dec. 1969, pp. 1571-1581.

Golfier et al., "On the ability of a Darcy-scale model to capture wormhole formation during the dissolution of a porous medium", Journal of Fluid Mechanics, Apr. 2002, vol. 457, pp. 213-254.

Harlow et al. "Two-Dimensional Hydrodynamic Calculations", Los Alamos Scientific lab. Rep. NLA-2301, 1959, 99 pages.

Hoefner ML and Fogler HS, "Pore evolution and channel formation during flow and reaction in porous media", AIChE Journal, Jan. 1988, vol. 34, No. 1, pp. 45-54.

Huang et al., "Prediction of Wormhole Population Density in Carbonate Miatrix Acidizing", SPE 54723, Society of Petroleum Engineers, 1999, 11 pages.

Huang et al., "Reaction Rate and Fluid Loss: The Keys to Wormhole Initiation and Propagation in Carbonate Acidizing", SPE 37312, Society of Petroleum Engineers, 1997, 775-784.

Liu et al., "A geochemical reaction-transport simulator for matrix acidizing analysis and design", Journal of Petroleum Science and Engineering, vol. 17, 1997, pp. 181-196.

Panga et al., "Two-Scale Continuum Model for Simulation of Wormholes in Carbonate Acidization", AIChE Journal, vol. 51, No. 12, Dec. 2005, pp. 3231-3248.

Perkins et al., "Widths of Hydraulic Fractures", Society of Petroleum Engineers, SPE 89, Sep. 1961, pp. 937-949.

Wang et al., "The Optimum Injection Rate for Matrix Acidizing of Carbonate Formations", SPE 26578, Society of Petroleum Engineers, 1993, pp. 675-687.

Notice of Allowance issued in Russian patent application No. 2020118772/03(031872) dated Nov. 26, 2020; 17 pages (with English translation).

* cited by examiner

METHOD FOR RESERVOIR STIMULATION ANALYSIS AND DESIGN BASED ON LAGRANGIAN APPROACH

BACKGROUND

Hydrocarbons (oil, natural gas, etc.) are obtained from a subterranean geologic formation (i.e., a "reservoir") by drilling a well that penetrates the hydrocarbon-bearing formation. This provides a partial flowpath for the hydrocarbon to reach the surface. In order for the hydrocarbon to be "produced," that is travel from the formation to the wellbore (and ultimately to the surface), there is a sufficiently unimpeded flowpath from the formation to the wellbore.

Fracturing and acidizing treatments are stimulation techniques used for the economic development of unconventional and many conventional reservoirs. Stimulation treatments are applied in order to increase well productivity. All fracturing and acidizing treatments are designed a-priory based on various input data such as reservoir data, proppant material, acid volume to be pumped, target productivity index of the well, etc.

To achieve a good economical outcome of a stimulation treatment, modern workflows for treatment design selection commonly involve numerical models of stimulation treatments. Their role is to ensure, for example, the desired proppant placement in the fracture without screenout (or proppant bridging), and to achieve the designed fracture/wormholes geometry and conductivity. Modern designs often consider a combination of different number of fluids (such as acids, gels), proppant materials and fibers during a stimulation treatment. Accurate modeling of simultaneous transport of these quantities inside the fracture/wormholes increases the complexity of the numerical models. Additionally, continuous development of new stimulation technologies creates new challenging modeling tasks. For example, in the case of pulsing proppant injection where the proppant pulses are short (<20 sec), a fine resolution in space and time is desired in order to accurately represent the proppant placement in a numerical solution.

There are numerous hydraulic fracturing and acidizing models commonly used in commercial software. For example, 2D PKN and KGD models consider either a vertical fracture of constant height or a penny-shaped fracture. Other models, such as Pseudo-3D (P3D) models are capable of estimating height growth for a single fracture, but cannot accurately represent the geometry in case of laminated reservoirs with multiple geological layers. However, an increased attention has been recently paid to development of models capable to simulate stimulation treatments such as fracturing and acidizing treatments, such as planar 3D models which are more accurate than P3D simulators.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of stimulating a subterranean formation that includes acquiring stimulation treatment input data, simulating a transport of at least one material transport present in a stimulation treatment design with a transport simulator model, where simulating includes assuming that for each time stage of the stimulation treatment a velocity field for the at least one material transport and a stimulated flow domain geometry are known and calculating at each time stage the distribution of at least one physical quantity of the at least one material transport using a Lagrangian approach, determining and preparing the treatment design and performing the stimulating treatment according to the selected treatment design.

In another aspect, embodiments of the present disclosure relate to a method for forecasting of materials transport distribution during and after stimulating a subterranean formation, the method including acquiring stimulation treatment input data, simulating a transport of at least one material transport present in a stimulation treatment design with a transport simulator model, where simulating comprises assuming that for each time stage of the stimulation treatment a velocity field for at least one material transport and a stimulated flow domain geometry are known and calculating at each time stage the distribution of at least one physical quantity of at least one material transport using a Lagrangian approach and outputting of simulation data.

Other aspects and advantages of the claimed subject matter will be apparent from the following description and the appended claims.

DETAILED DESCRIPTION

Figure 1:
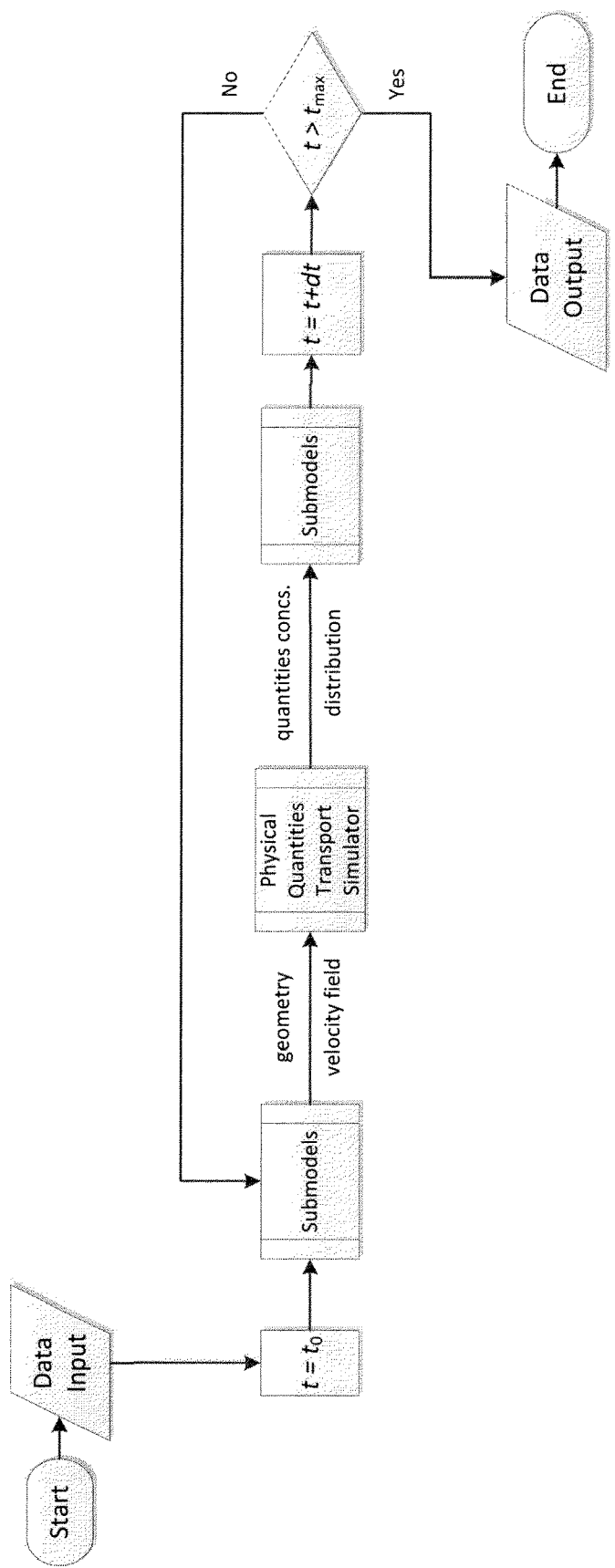
FIG. 1 shows a flowchart of a stimulation model according to the present embodiments.

Generally, embodiments disclosed herein relate to stimulation treatments to improve well performance and recovery of hydrocarbons in subterranean formations. More specifically, the present embodiments relate to stimulation treatment design models that may adequately simulate the transport of at least one material transport present in a stimulation treatment design. The inventors of the present disclosure have discovered that the transport of at least one material transport present in a stimulation treatment design may be simulated using a transport simulator model that involves a Lagrangian approach for representing the distribution of at least one material transport at each time moment. This involves using the stimulation treatment input data. For example, such a Lagrangian approach which may be selected from the group of particle-in-cell (PIC) algorithms with different shape functions and, methods of characteristics and combinations thereof. Such approach may allow for determining and preparing a stimulation treatment design which may be used to achieve a desired stimulation of a subterranean formation.

As defined herein, a stimulation treatment of a subterranean formation involves a treatment of the formation to restore or enhance the productivity of a well. Stimulation treatments may be classified in hydraulic fracturing treatments and acidizing treatments. Fracturing treatments may be performed above the fracture pressure of the reservoir formation and may create a highly conductive flow path between the reservoir and the wellbore. In such embodiments, the fracturing operation may be a conventional hydraulic fracturing, a pulse hydraulic fracturing, or a combination thereof. Such types of fracturing will be described later in greater details. In one or more embodiments, the stimulation treatment may involve both a conventional and a pulse hydraulic fracturing.

Acidizing may also be used to stimulate hydrocarbon production from a well. There are two types of acidizing treatments: (1) matrix acidizing and (2) fracture acidizing with the difference between them relating to injection rates and pressures. Fracture acidizing is acidizing at injection rates above fracture pressure. Fracture acidizing is used for creating cracks or fractures in the formation to increase the available flow area and thereby increase well productivity. Acidizing at injection rates below fracture pressure is termed matrix acidizing. Matrix acidizing is primarily used for damage removal and to restore the permeability to original reservoir permeability or higher.

As described later in greater detail, as a result of the stimulation treatment of a subterranean formation, a stimulated flow domain may appear in the formation. Depending on the type of the stimulation treatment, the stimulated flow domain may contain a fracture caused by a conventional or a pulse fracturing treatment, or wormholes caused by an acidic treatment of the formation.

Generally, a stimulation treatment of a subterranean formation includes besides fluids, a variety of additives. According to the present embodiments, the materials included in the stimulation treatment design are defined herein as materials transport. Examples of such components may include fluids, acids, fibers, proppants materials, viscosifiers, breakers, friction reducers, gases for energized fluids and combinations of thereof. For example, in the case of hydraulic fracturing treatments, proppants may be included into the stimulation treatment design. In embodiments where the stimulation treatment is an acidic fracturing or an acidizing treatment, the fluid may include at least one acid.

Without being bound by the theory, it is assumed that each material transport included in a stimulation treatment design may be characterized by its velocity field and the geometry of the stimulated flow domain. This data may be sufficient to calculate the transport of at least one physical quantity describing the distributions of materials transport during and after formation treatment.

According to the present embodiments, it is assumed that the distribution of each material transport may be represented via a plurality of particles, where N represents the total number N. Therefore, as described later in greater detail, the materials transport may be quantified by calculating the motion of these particles in the stimulated flow domain.

According to the present embodiments, a stimulation treatment is simulated and optimized a-priori to the application of the treatment per se. By doing this, the optimum parameters which may be used to increase the production to a desired level may be determined. In one or more embodiments, a set of input data is used to create submodels and transport models of the components of the treatment fluid before injecting the stimulation treatment fluid into a subterranean formation.

At each time stage, at least a physical quantity (such as a physical quantity concentration) and its distribution in the stimulated flow domain caused by the stimulation treatment may be solved to satisfy the governing flow equations. The solution may be obtained using an iterative scheme. The physical quantity distribution may be determined by solving the governing equations.

The stimulation treatment model as described herein may provide a design tool to predict the distribution of the concentration of each material transport in the stimulated flow domain to achieve optimal well productivity. Referring now to FIG. 1, FIG. 1 describes a flowchart of a stimulation treatment model that may be used in one or more embodiments. According to the present embodiments, such flowchart may be used in hydraulic fracturing, acid fracturing or acidizing treatments and involves a transport simulator. As seen in FIG. 1, the design process may involve the following stages:

1. Start.
2. Define input data.
3. Obtain a forecast for each time stage (t, t+dt) of the stimulation treatment, when the geometry of the stimulated flow domain and flux distributions are known.
4. Obtain a forecast for the spatial distribution of materials transport present in the stimulation treatment design using a transport simulator model.
5. Optimize the stimulation treatment by using the transport simulator model and a production simulator that may predict the productivity increase for the studied system.

Referring now to the second stage of the modeling workflow, the second stage may involve defining and constructing the data for the formation layers and their geomechanical properties through logs. To accomplish this, collection of all pertinent well completion and reservoir data for the design, as well as fracture network description (fracture location, spacing, width, etc.) may be performed. In one or more embodiments, the input data may be selected from the group of subterranean formation layer geomechanical properties, well completion and reservoir data for the subterranean formation, pumping schedule data, proppant materials data, fluids to be pumped data, target productivity index of the well data and combinations thereof.

Referring now to the third stage of the modeling workflow, the third stage may involve obtaining a forecast for a stimulated flow domain geometry and distributions of fluxes in this domain. Here, the fluxes are rates of volume flow of materials transport. To accomplish this, collection of all pertinent submodels of fracture growth and acidizing may be used. These submodels are simulated based on the input data.

Referring now to the fourth stage, as noted above, it is assumed that for each time stage (t, t+dt) of the stimulation treatment, the geometry of the stimulated flow domain and the flux distributions are known. This data may be sufficient for a mathematical description of the transport of materials transport present in the simulation treatment design. The geometry of the stimulated flow domain and flux distributions may be used to obtain the velocity field used in equations (1) and (2) at each spatial point of the stimulated flow domain. Convective transport of each material transport is described by equation (2). Initial and boundary conditions are assumed to be defined to obtain a well-posed mathematical statement. Equation (2) may be used to obtain a mathematical function describing a physical quantity concentration of any material transport present in the simulation treatment design as a mathematical function of the generalized coordinates and time.

In one or more embodiments, after simulating the transport of at least one material transport present in the stimulation treatment design, the optimum stimulation treatment design may be determined. In such embodiments, the optimum stimulation treatment design may be prepared and injected into the subterranean formation. By using the optimum stimulation treatment design as described herein, a desired stimulation of the subterranean formation may be achieved. As defined herein, determining an optimum stimulation treatment design may involve determining the optimum stimulation fluids, proppant materials, acids, viscosifiers, breakers, friction reducers, gases for energized fluids, pumping times, flow rates, and proppant and fiber concentrations for each pumping stage. For example, in one embodiment, the treatment design may include selection of materials transport to be used, pumping times, and materials transport concentration for each stage of the treatment.

Referring back to FIG. 1, FIG. 1 depicts a flowchart of a stimulation model. As seen in FIG. 1, the input of the data set represents the information that may be used to create submodels used in the stimulation model workflow, as well as physical quantities transport simulators. The input data is provided to a computer (not shown), and combined with specific software instructions to generate values representing at least a physical quantity of the materials transport. If the user-defined time limit is achieved, then the loop stops, a set of output data is generated and the simulation of the stimulating treatment is terminated. The data output is afterwards used to perform the stimulation treatment per se. According to the present embodiments, the simulating process may be applied to two-dimensional or three-dimensional systems.

According to the present embodiments, simulation of a stimulation treatment involves generating a mathematical model that describes multiple physical quantities (such as fluids, proppant, fibers, etc.) inside the stimulated flow domain formed during a stimulation treatment. Such transport models may be solved by using various methods, such as 2D models, pseudo-3D models, planar 3D models or PL3D, single wormhole models, networks models, or averaged models. As described later in greater detail, the mathematical models that have shown utility in the present disclosure are the particle-in-cell algorithms with different shape functions, methods of characteristics and combinations thereof.

In one or more embodiments of the present disclosure, a stimulation treatment model is a mathematical transport model of various components present in a stimulation fluid that is capable to simulate the transport of such multiple components. As described later in greater detail, the stimulation treatment design may include fluids, proppant materials, fibers, breakers, acids, viscosifiers, friction reducers, gases for energized fluids and combinations thereof. All these are considered materials transport as they are transported by the stimulation treatment fluid during the stimulation treatment of the formation.

According to the present embodiments, the transport model as described herein adheres with the laws of physics governing the surface deformation of the created stimulated flow domain, the fluid transport in the stimulated flow domain and the leakoff of the fracturing fluid into the permeable rock. In embodiments that involve hydraulic fracturing, the transport model includes also the transport of all components present in a stimulation fluid within the stimulated flow domain carried by the stimulation fluid. Due to the complexity and highly nonlinear nature of the formulated mathematical model, the transport model may be solved through a numerical method.

The mathematical model used in accordance with methods as described herein is based on the assumptions and the mathematical equations used in fluid mechanics. Considering a particle that moves within the stimulated flow domain in the subterranean formation, the Lagrangian approach may consider the path of the particle and may completely characterize the motion of the particle.

According to the present embodiments, it is assumed that for each time stage (t, t+dt) of the stimulation treatment, there is a known geometry of the stimulated flow domain formed as a result of the stimulation treatment, as well as a velocity field for at least one material transport of the stimulation treatment. As previously discussed, the stimulated flow domain may be a fracture or a wormhole, depending on the type of stimulation treatment. It is also envisioned that a physical quantity may be defined and solved based on the input data. In such embodiments, the physical quantity may be a physical quantity concentration of any material transport present in the stimulation treatment design, such as for example fluids, fibers, acids, viscosifiers, breakers, friction reducers and gases for energized fluids or proppant materials. According to the present embodiments, the physical quantity may be described using a Lagrangian approach. In such embodiments, a physical quantity distribution profile may be represented as a set of Lagrangian particles of known shape function.

For example, by considering the above assumptions, the model may predict for each time stage a physical quantity distribution in the system. This is accomplished by solving the governing equations and satisfying the boundary conditions as described later in greater detail. For the sake of simplicity, the velocity is denoted in equation (1) as follows:

$$\vec{v} = (u, v, w) \quad (1)$$

As noted above, the stimulation treatment design may contain a variety of materials transport. As previously discussed, such materials transport may be formed of particles that flow within the stimulation treatment fluid. According to the Lagrangian approach, the convective transport of a physical quantity concentration, c(x, y, z), is described by the following equation (2):

$$\frac{\partial c}{\partial t} + \frac{\partial (cu)}{\partial x} + \frac{\partial (cv)}{\partial y} + \frac{\partial (cw)}{\partial z} = 0 \quad (2)$$

As previously discussed, the physical quantity concentration may characterize the fluid or other material transport present in the stimulation treatment design. Initial and boundary conditions for equation (2) are assumed to be defined in such a manner to obtain a well-posed mathematical statement.

According to the present embodiments, the boundary value for equation (2) is solved by using the particle-in-cell (PIC) method to allow the solution in a reasonable computation time. As defined herein, the particle-in-cell (PIC) method is a technique used to solve a certain class of partial differential equations. In this method, individual particles (or fluid elements) in a Lagrangian frame are tracked in continuous phase space, whereas moments of the distribution such as for example densities and fluxes are computed simultaneously on Eulerian (stationary) mesh points. The PIC approach has no numerical diffusion, has an accurate representation of fine-scale physical effects even at relatively small number of tracing particles, has the ability to transport multiple physical quantities independently, and has the ability to track different properties associated with each individual particle within a physical quantity such as streamlines and exposure time. The PIC method may be regarded as a finite element approach where the finite elements are moving and overlapping. Each finite element represents a large number of quantity particles that are located near each other in space. According to the present embodiments, the PIC method is used, which renders the mathematical equation much simpler to solve. As described herein, the particle-in-cell method involves solving the physical quantity as a function of at least a physical quantity mass carried by a particle and a mass distribution within the particle.

In one or more embodiments, the PIC method involves the representation of the approximate concentration distribution $c_h(t, \vec{x})$ in the form presented below in equation (3):

$$c_h(t,\vec{x}) = \sum_{j=1}^{N} C_j R(\vec{x}-\vec{x}_j(t)) \qquad (3)$$

where quantities $C_j$, j=1, ..., N, define a physical quantity mass carrying a single particle, and N is the total number of particles. Function $R(\vec{x})$ is known as a particle kernel (shape function) which defines the mass distribution within a particle. The vector-function $\vec{x}_j(t)$ corresponds to the center of particle number j at different time moments. According to the present embodiments, various known shape functions, such as delta function (nearest grid point), rectangular function (cloud-in-cell), may be used.

In one or more embodiments, the motion of the particles present in the stimulation treatment fluid may be governed by the following equation (4):

$$\frac{d\vec{x}_j}{dt} = \vec{v}(t, \vec{x}_j), \, j = 1, \ldots, N \qquad (4)$$

Equations (4) may be numerically integrated by well-known methods for ordinary differential equations, such as Euler method, Runge-Katta method, etc.

Methods as described herein may also be used to adjust the fluid components during a stimulation operation to achieve a further optimized fluid and treatment schedule. The model may be used to further extrapolate monitored surface characteristics such as viscosity, pumping rate, temperature, VES concentration, polymer concentration, cross-linker concentration, breaker concentration to bottom hole or formation conditions.

One embodiment of the present disclosure includes a method of stimulating a subterranean formation. In such an illustrative embodiment, the method involves acquiring stimulation treatment input data, simulating a transport of at least one material transport present in a stimulation treatment design with a transport simulator model, determining and preparing the treatment design to achieve a desired stimulation of the subterranean formation and performing the stimulating treatment according to the selected treatment design, such as for example, injecting the optimum stimulation corresponding to the optimum treatment design into the subterranean formation. According to the present embodiments, determining the treatment design may include selection of materials transport, pumping times and materials transport concentration for each time stage of the treatment. As previously described, simulating a transport of at least one material transport present in the stimulation treatment fluid involves assuming that for each time stage of the stimulation treatment a velocity field for the at least one material transport included into the stimulation treatment design and a stimulated flow domain geometry are known, calculating at each time stage the distribution of at least one physical quantity using a Lagrangian approach (PIC method or method of characteristics) and generating a physical quantity distribution profile. In yet another embodiment, the physical quantity may be a physical quantity concentration. In such embodiments, the physical quantity concentration may characterize the concentration of any materials transport present in the stimulation treatment design, such as for example fluids, fibers, viscosifiers, proppant materials, acids, breakers, friction reducers, and gases for energized fluids. In yet another embodiment, the physical quantity of a material transport may be selected from the group of concentration, mass, volume, electric charge, amount of substance of the material transport present in a stimulation treatment design. It is also envisioned that a conductivity distribution may be calculated using a simulated materials transport distribution. Afterwards, a forecast for a wellbore productivity may be obtained and the wellbore productivity may be optimized by modifying the stimulation treatment design. As noted above, the stimulation treatment may be a hydraulic fracturing treatment, or an acidizing treatment. For example, in one embodiment, the stimulation treatment may be a hydraulic fracturing treatment with and without pulsing injection of materials transport. In yet another embodiment, the stimulation treatment may be an acidic fracturing treatment.

In yet another embodiment, the method of stimulating a subterranean formation may be a hydraulic fracturing treatment. In such an illustrative embodiment, the method may include acquiring hydraulic fracturing input data, simulating a transport of at least one material transport present in the hydraulic fluid, determining and preparing an optimum hydraulic fluid to achieve a desired fracturing of the formation and injecting sequentially into the subterranean formation, alternate stages of at least a clean pulse of the optimum hydraulic fluid and at least a dirty pulse of a proppant-containing optimum fracturing fluid to fracture the subterranean formation with the formation of at least one fracture. In such embodiments, simulating a transport of at least one material transport present in the hydraulic fluid may include assuming that for each time stage of the hydraulic fracturing treatment a velocity field for the at least one material transport and a stimulated flow domain geometry are known, defining at least one physical quantity using a Lagrangian approach (PIC method or method of characteristics) and generating one physical quantity distribution profile. In one or more embodiments, simulating a transport of at least two materials transport used in the hydraulic fracturing fluid may be generated simultaneously, successively or in any other sequence.

It is also envisioned that a method for forecasting of materials transport distribution during and after stimulating a subterranean formation may be used during a stimulation operation. In such an illustrative embodiment, the method for forecasting of materials transport distribution may include acquiring stimulation treatment input data, simulating a transport of at least one material transport present in a stimulation treatment design with a transport simulator model, and outputting of simulation data. According to the present embodiments, outputting of simulation data may be carried out for distributions of physical quantities during and after the stimulation treatment of the subterranean formation. In such embodiments, simulating a transport of at least one material present in the stimulation treatment design with a transport simulator model includes assuming that for each time stage of the stimulation treatment a velocity field for the at least one material transport and a stimulated flow domain geometry are known and calculating at each stage the distribution of at least one physical quantity of the at least one material transport using a Lagrangian. In such embodiments, the stimulation treatment may be selected from the group of hydraulic fracturing with and without pulsing injection of materials transport, acidic fracturing and acidizing treatments. It is also envisioned that the method for forecasting of materials transport distribution during and after stimulating a subterranean formation may further include calculating a conductivity distribution using the simulated materials transport distribution, obtaining a forecast for a wellbore productivity and optimizing the wellbore productivity by modifying the stimulation treatment design.

Hydraulic fracturing, also referred to as fracking, is a primary tool for improving well productivity by creating or extending fractures or channels from the wellbore to the reservoir. Pumping of propping granules, or proppants, during the hydraulic fracturing of oil and gas containing earth formations may enhance the hydrocarbon production capabilities of the earth formation.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation.

In most cases, a hydraulic fracturing involves pumping a proppant-free viscous fluid, or pad, such as water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added.

In the fracturing treatment, the fluids may be used in the pad treatment, the proppant stage, or both. The components of the liquid phase may be mixed on the surface. It is also envisioned that a fluid may be prepared on the surface and pumped down tubing while the gas component could be pumped down the annular to mix down hole, or vice versa.

Proppant materials may comprise naturally occurring sand grains or gravel, man-made or specially engineered proppants, such as fibers, resin-coated sand, or high-strength ceramic materials, e.g. sintered bauxite. The proppant collects heterogeneously or homogenously inside the fracture to "prop" open the new cracks or pores in the formation. The proppant creates planes of permeable conduits through which production fluids can flow to the wellbore. The fracturing fluids are of high viscosity, and therefore capable of carrying effective volumes of proppant material.

The general concept of "pulse fracturing" will now be described. In a hydraulic fracturing method for a subterranean formation, a first stage referred to as the "pad stage" involves injecting a fracturing fluid into a wellbore at a sufficiently high flow rate that creates a hydraulic fracture in the formation. The pad stage is pumped until the fracture is of sufficient dimensions to accommodate the subsequent slurries pumped in the proppant stages. After the "pad stage", several stages referred to as "proppant stages" or "propped stages" are injected into formation, in which solid proppant particles are suspended in the fluid. While conventional fracturing techniques may include the continuous introduction of proppants, embodiments also include the periodic introduction of proppants. In such embodiments, a proppant stage involves the periodical introduction of proppants into the fracturing fluid to form a suspension. Thus, the propped stage may be divided into two periodically repeated sub-stages, the "carrier sub-stage" or the "clean pulse" that involves injection of fracturing fluid without proppant, and the "propping sub-stage" or the "dirty pulse" that involves addition of proppant into the fracturing fluid. As a result of the periodic slugging of slurry containing proppant, the proppant does not completely fill the fracture. Rather, spaced proppant clusters (not shown) form as posts or pillars with channels between them for fluids to pass between the pillars. The volumes of dirty pulse and clean pulse as pumped may be different, or may change over time.

Hydraulic fracturing fluids of the present disclosure may be aqueous solutions containing a thickener, such as a soluble polysaccharide, to provide sufficient viscosity to transport the proppant. Typical thickeners are polymers, such as guar (phytogeneous polysaccharide), and guar derivatives (hydropropyl guar, carboxymethylhydropropyl guar). Other polymers and other materials, such as xanthan, scleroglucan, cellulose derivatives, polyacrylamide and polyacrylate polymers and copolymers, viscoelastic surfactants, and the like, can be used also as thickeners. For example, water with guar represents a linear gel with a viscosity that increases with polymer concentration. Cross-linking agents are used which provide engagement between polymer chains to form sufficiently strong couplings that increase the gel viscosity and create visco-elasticity. Common crosslinking agents for guar include boron-, titanium-, zirconium-, and aluminum-laden chemical compounds.

Fibers can be used to enhance the ability of the fracturing fluids to transport proppant and to mitigate proppant settling within the hydraulic fracture. For operations in which proppant is pumped in slugs or pulses, fibers can also be used to mitigate the dispersion of the proppant slugs as they travel throughout the well completion and into the fracture. Fibers used may be hydrophilic or hydrophobic in nature. Fibers can be any fibrous material, such as, but not limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Other examples of useful fibers include, but are not limited to, polylactic acid polyester fibers, polyglycolic acid polyester fibers, polyvinyl alcohol fibers, and the like.

Some fluids used in the present disclosure are crosslinked polymer based fluids, or linear polymer based fluids, used for treating a subterranean formation. The fluids typically include a polymer viscosifying agent and a crosslinker. Non-limiting examples of polymer viscosifiers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Also, associative polymers for which viscosity properties are enhanced by suitable surfactants and hydrophobically modified polymers can be used, such as cases where a charged polymer in the presence of a surfactant having an electric charge that is opposite to that of the charged polymer, the surfactant being capable of forming an ion-pair association with the polymer resulting in a hydrophobically modified polymer having a plurality of hydrophobic groups.

Fluids used in the embodiments of the present disclosure may be based upon an aqueous or nonaqueous medium, or even a gelled oil. When the fluid is based upon an aqueous medium, the medium may be water or brine. In those embodiments of the disclosure where the aqueous medium is a brine, the brine is water containing inorganic salts and/or organic salts. In one or more embodiments, the inorganic salts may include alkali metal halides, such as potassium chloride. The carrier brine phase may also comprise an organic salt, such as sodium or potassium formate. It is also envisioned that inorganic divalent salts, such as calcium halides, may be used.

Fluids used in accordance with the present disclosure may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself.

In one or more embodiments, a viscoelastic surfactant (VES) is used as a viscosifying agent. The VES may be selected from the group of cationic, anionic, zwitterionic, amphoteric, nonionic and combinations thereof. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three-dimensional structure formed by the components in the fluids. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof.

Fluids used in methods of the present disclosure may further contain other additives and chemicals that are known to be commonly used in oilfield applications by those skilled in the art. These include, but are not limited to, materials such as surfactants, foaming agents, crosslinking delay agent, breaker delay agents, particles, proppants, gas component, breaker aids, oxygen scavengers, alcohols, scale inhibitors, corrosion inhibitors, fluid-loss additives, bactericides, friction reducers, latexes, emulsions, emulsifiers, and the like.

EXAMPLES

The following examples are presented to further illustrate the transport model in accordance with the present disclosure, and should not be construed to limit the scope of the disclosure, unless otherwise expressly indicated in the appended claims.

Example 1. Point Source Injection of Proppant

In order to demonstrate the capabilities of the PIC method for physical quantities transport, a proppant transport simulation example was generated. Computational results for a 2D test problem are shown here. This model is related to the injection of several proppant pulses into a rectangular domain.

Figure 2:
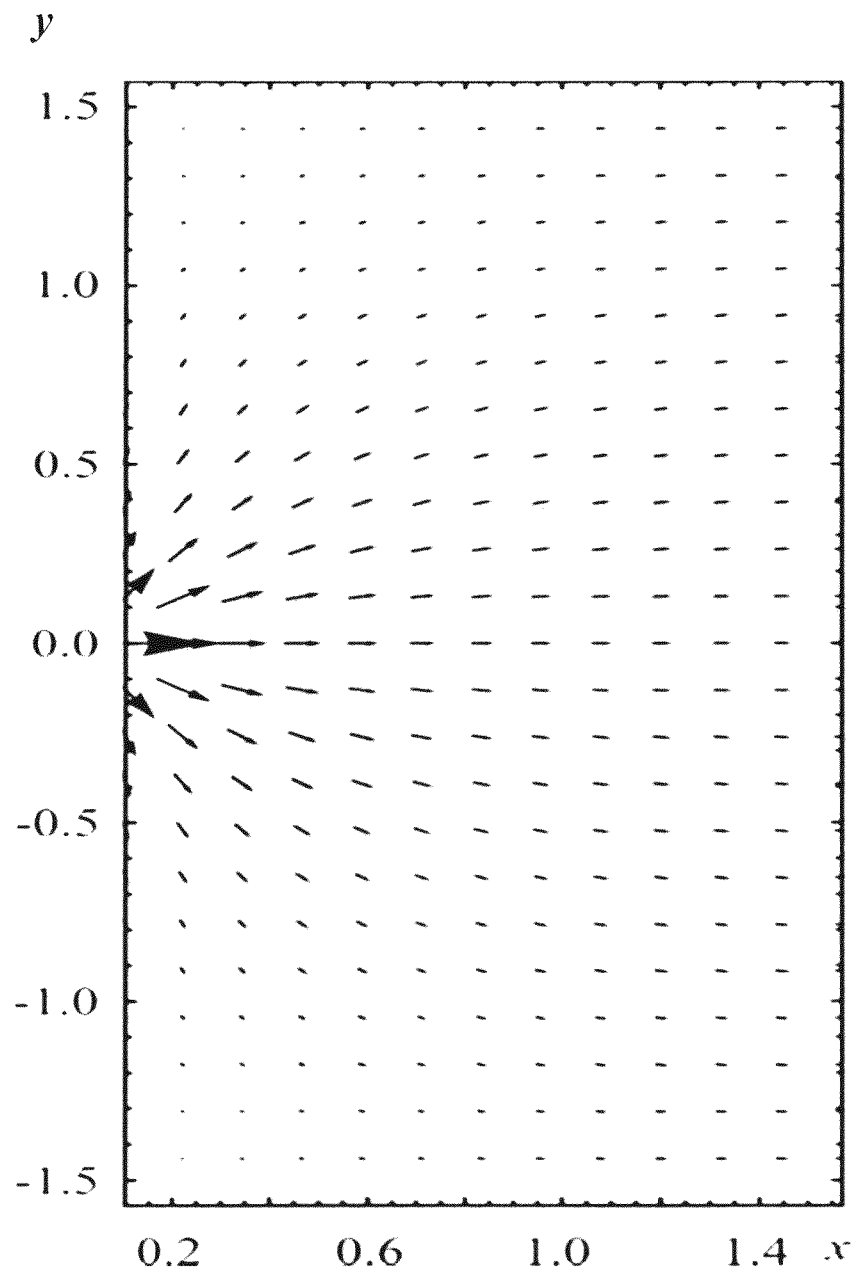
FIG. 2 shows a velocity field according to the present embodiments.
Figure 3:
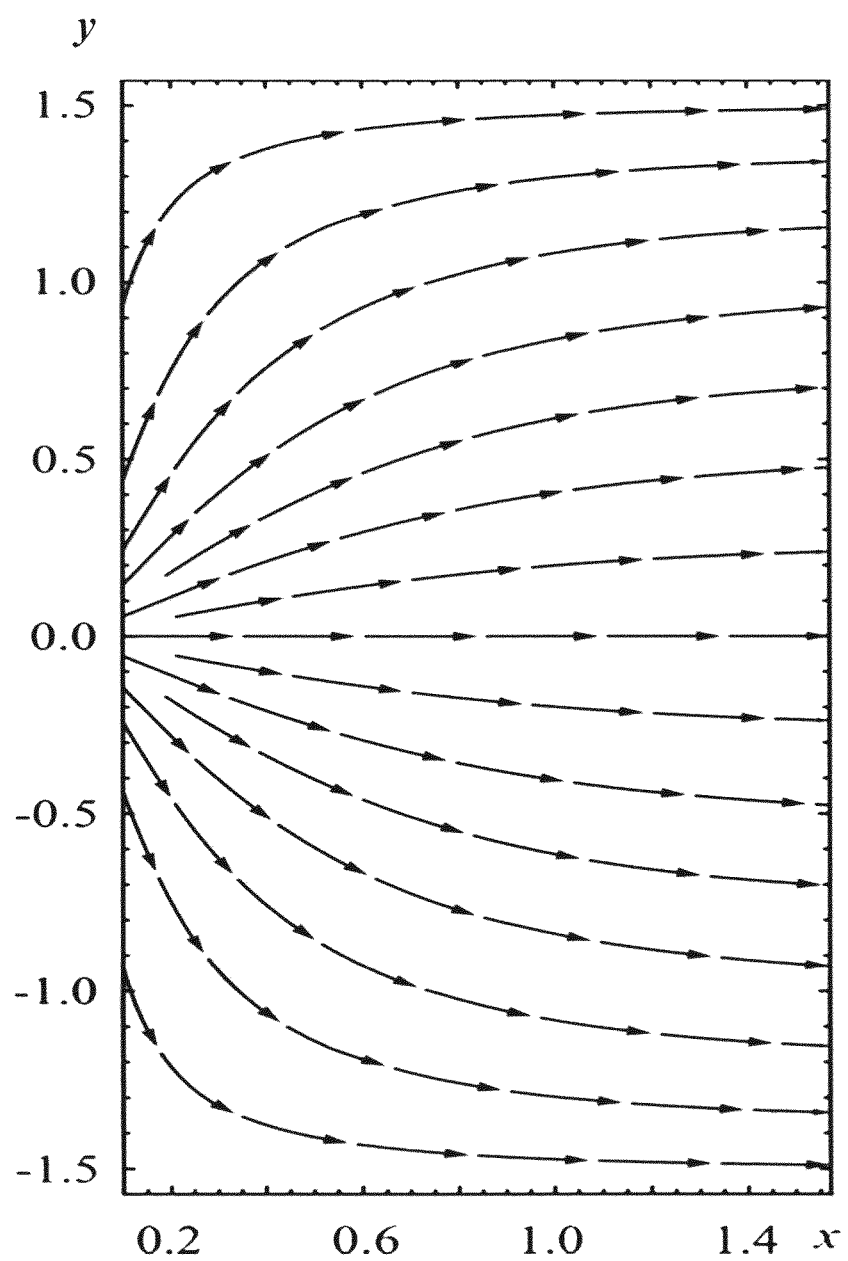
FIG. 3 shows streamlines according to the present embodiments.

For the sake of simplicity, the example is considered in dimensionless variables. Velocity field distribution and streamlines of the flow are shown in FIGS. 2 and 3. Here, velocity components are defined by the following formulas:

$$u(x, y) = \frac{\cosh x \sinh x}{-\pi \cos(2y) + \pi \cosh(2x)}, \tag{5}$$

$$v(x, y) = \frac{\cos y \sin y}{-\pi \cos(2y) + \pi \cosh(2x)}$$

The domain shown in FIG. 2 was filled with clean fluid with zero proppant concentration at t=0. Proppant pulses were injected through a part of the left boundary {x=0; −0.1<y<0.1}. The duration of each pulse and the interval between them was equal to 1 (dimensional time unit). The computation was performed until $t=t_{max}=5.25$.

Figure 4:
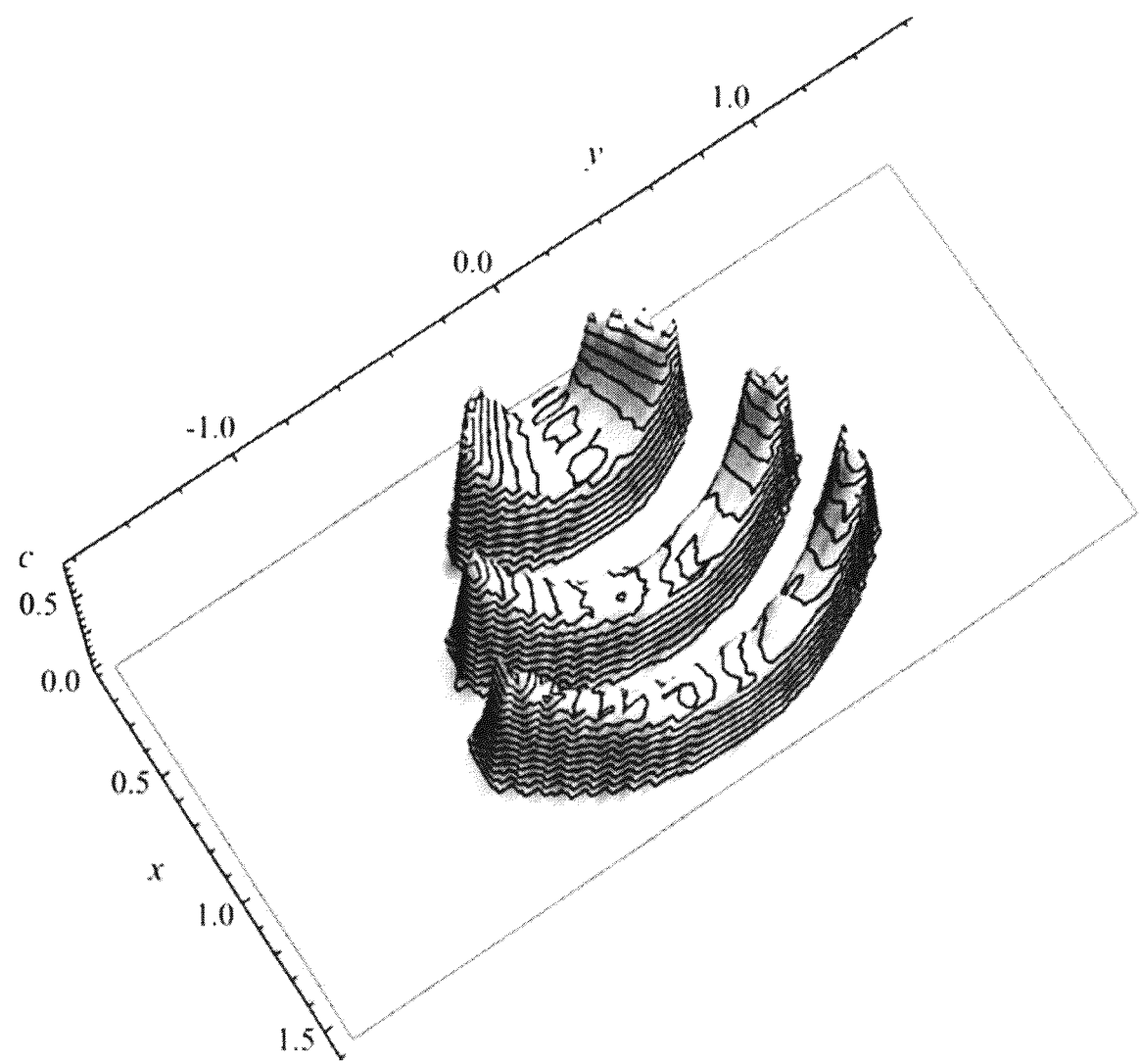
FIG. 4 depicts a proppant concentration profile calculated according to the present embodiments.
Figure 6:
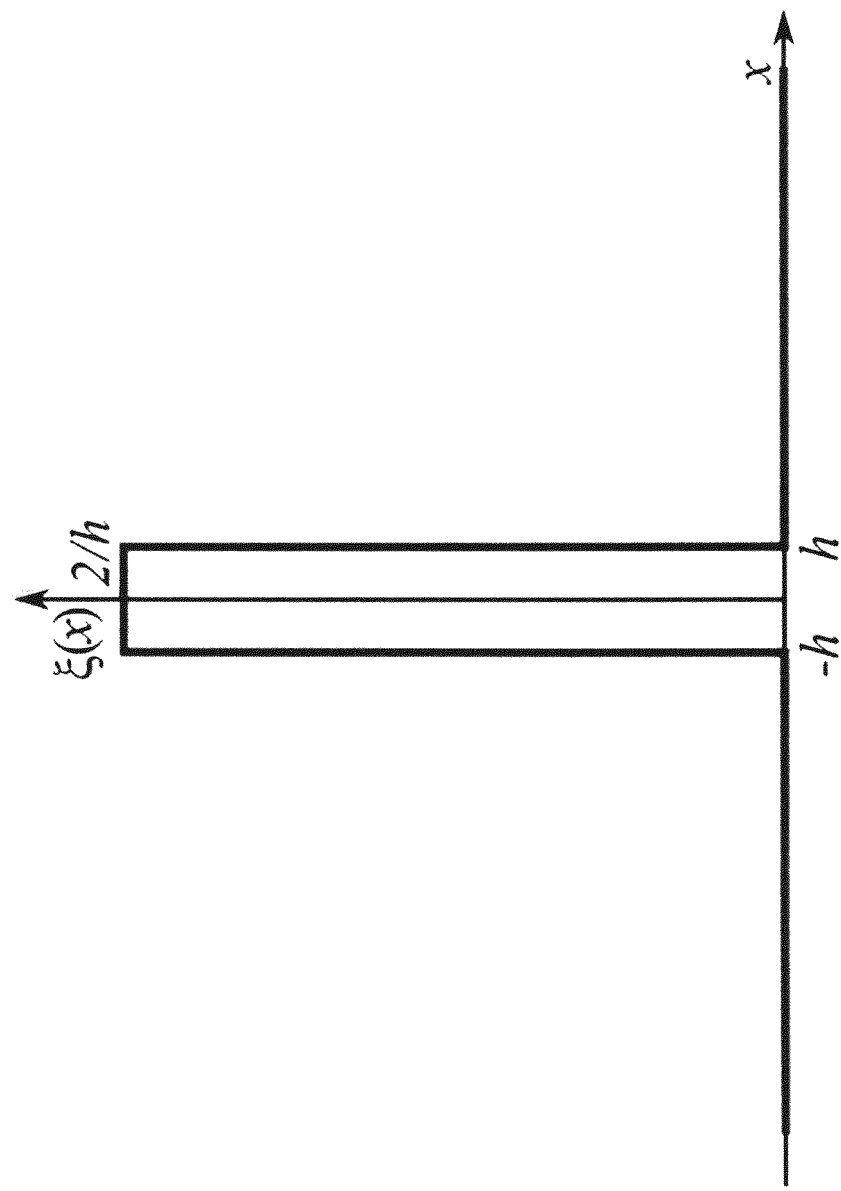
FIG. 6 shows a schematic plot of function $\xi(x)$ according to the present embodiments.

Referring now to FIG. 4, FIG. 4 shows the proppant concentration profile calculated at $t=t_{max}$ by PIC method with 23 000 particles with kernel $R(x, y)=\xi(x)\xi(y)$, where $\xi(x)$ is presented in FIG. 6. Here, h is the size of a particle. Integration of equations (3) was performed using Euler method. It is seen that the PIC method may allow representation of pulses without numerical diffusion. Comparison of the concentration profile with the exact solution shows that the relative error at $t=t_{max}$ is 7%. The relative error was calculated in norm $L_2(\Omega)$ using the formula $$\left( \frac{\int_\Omega (c_h(t_{max}, x, y) - c_{exact}(t_{max}, x, y))^2 dx\, dy}{\int_\Omega (c_{exact}(t_{max}, x, y))^2 dx\, dy} \right)^{1/2} \tag{6}$$

Figure 5:
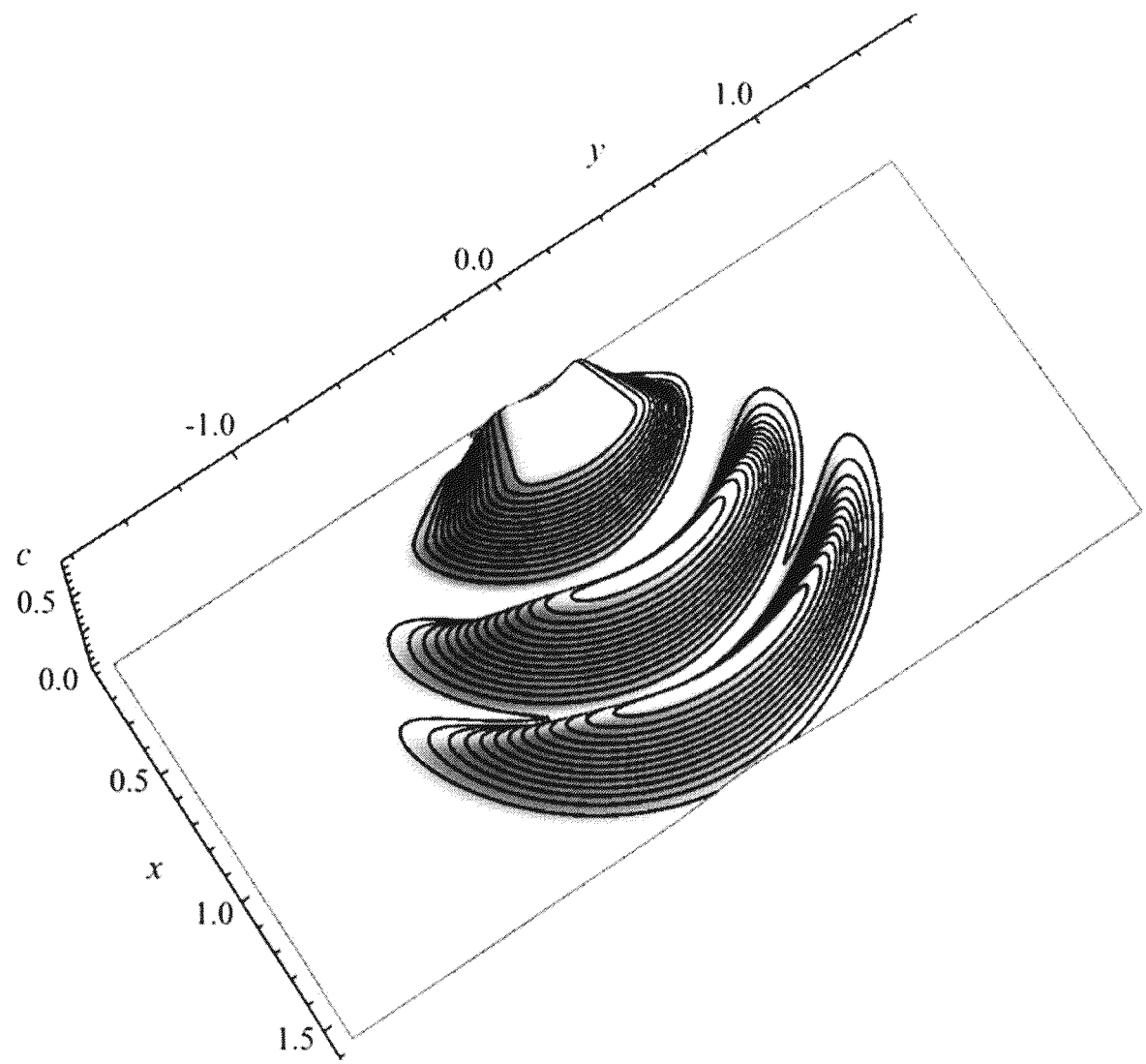
FIG. 5 depicts a proppant concentration profile calculated using an upwind finite-difference scheme.

Referring to FIG. 5, FIG. 5 shows the concentration profile calculated at $t=t_{max}$ by a well-known upwind finite-difference scheme on a rectangular uniform grid 201×201× 801 ($N_x \times N_y \times N_t$), where $N_x$ and $N_y$ are grid sizes in x and y directions respectively, $N_t$ is the total number of time stages. The amount of arithmetic operations performed in upwind scheme on this grid is larger than in the PIC method with 23 000 particles. However, the relative error of the solution obtained by the scheme is 49%. Such a large error is caused by the influence of numerical diffusion here. The discontinuities of the concentration profile are smoothed and not accurately represented in FIG. 5. The example shows the role of the numerical diffusion in the simulation of proppant pulses transport.

Computational results presented here demonstrate that the PIC method does not introduce artificial numerical diffusion.

Example 2. Transport of Proppant Slugs in Narrow Channel

Figure 7:
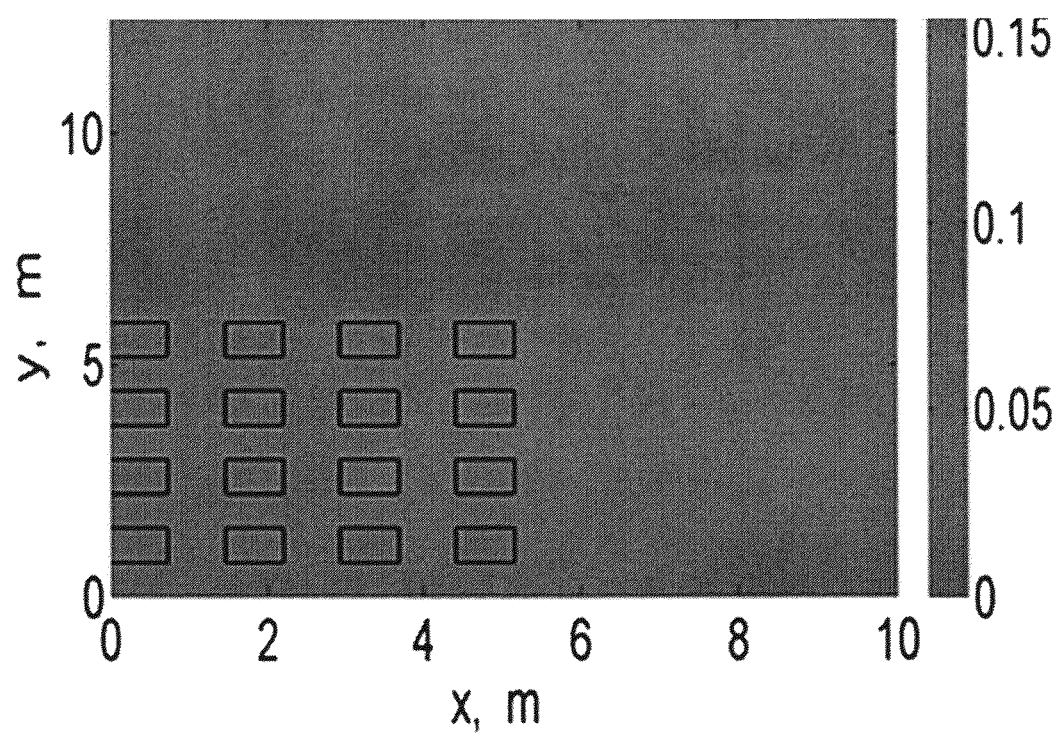
FIG. 7 shows an initial distribution of a proppant concentration according to the present embodiments.

A narrow channel (slot) with smooth plane walls is considered. Slot dimensions are $L_x$=12.5 m (length), $L_y$=12.5 m (height), w=0.01 m (width). At initial time t=0 sec. the proppant material is grouped into square slugs of the size 0.7×0.7 m, where proppant concentration (volume fraction) is 0.15 (see FIG. 7). Thus, FIG. 7 represents the initial distribution of proppant concentration at t=0 sec.

Transport of proppant slugs along constant velocity field u=v=0.001 m/sec is simulated on grid 499×499 ($N_x \times N_y$) with time stage 12.5 sec. Fluid leaks off through slot walls and proppant settling are neglected.

Figure 8:
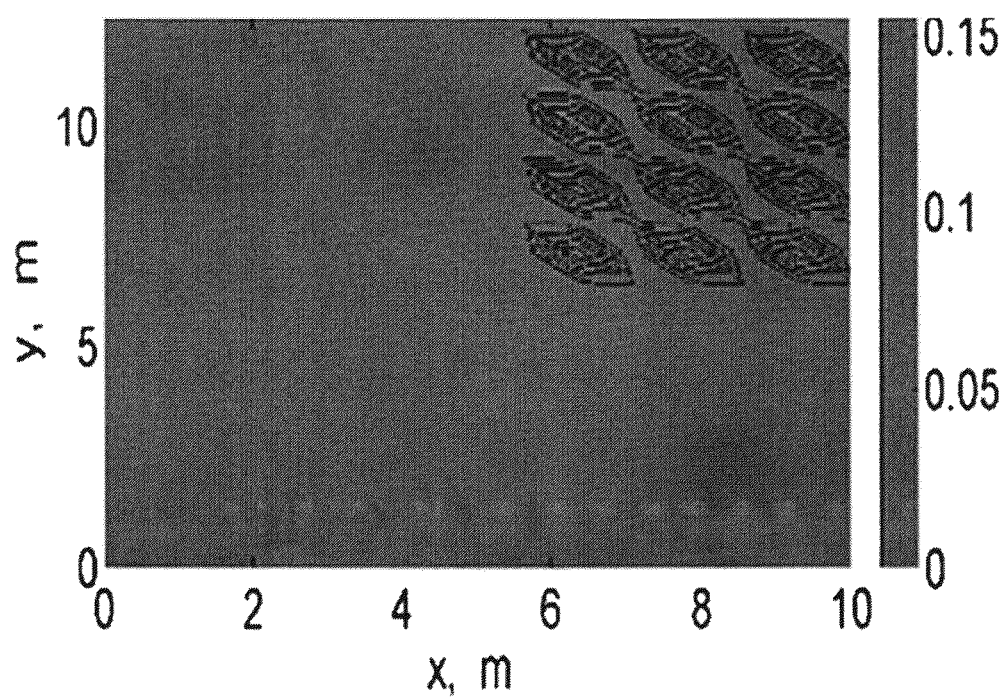
FIG. 8 shows distributions of proppant concentration calculated using the TVD scheme.
Figure 9:
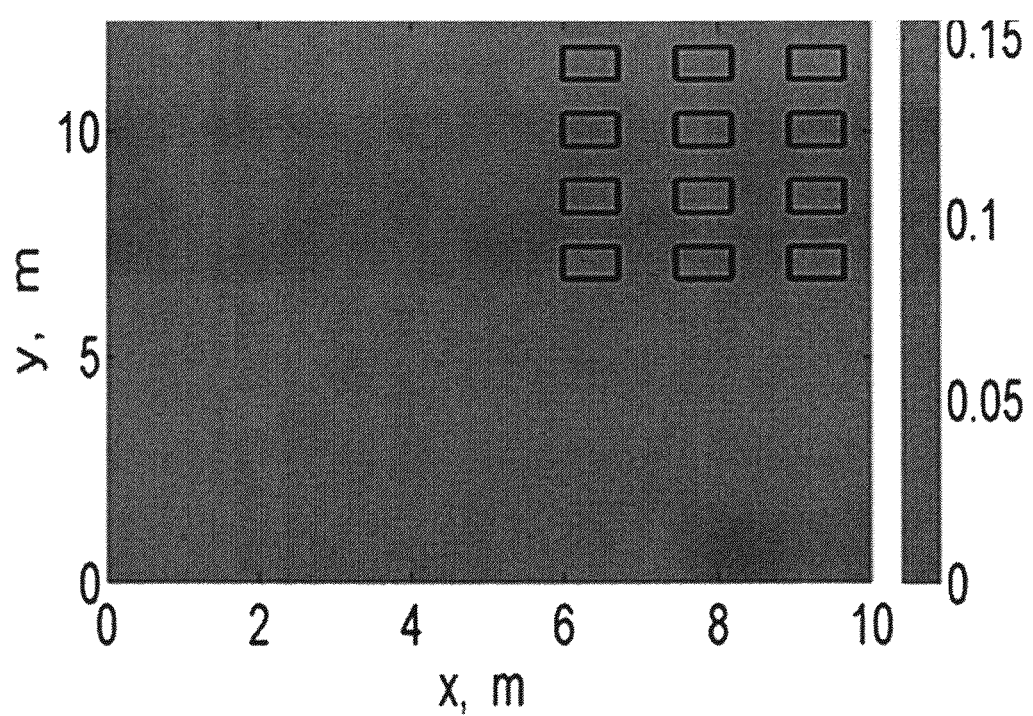
FIG. 9 shows distributions of a proppant concentration calculated according to the present embodiments.

FIGS. 8 and 9 show the distributions of proppant concentration calculated at 6000 sec. The TVD scheme was used to generate the distribution depicted in FIG. 8. FIG. 9 depicts the distribution of the proppant concentration calculated at t=6000 sec. using the PIC method with 9 particles per each cell. As seen from FIG. 8, fronts of the slugs calculated by TVD scheme are strongly affected by the numerical diffusion of the method. Lagrangian method preserves sharp fronts and produces more accurate results than TVD.

Advantageously, embodiments of the present disclosure may provide numerical simulations of arbitrary physical quantities transport in various stimulation treatments. The use of the particle-in-cell method to generate a stimulation model allows for no numerical diffusion, ability to transport multiple physical quantities independently, as well as the ability to track different properties associated with each individual particle within a physical quantity. The stimulating methods as described herein may be applied to hydraulic and acidic fracturing, as well as acidizing treatments.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of stimulating a subterranean formation, comprising:
   acquiring stimulation treatment input data;
   simulating a transport of at least one material transport present in a stimulation treatment design with a transport simulator model, wherein simulating comprises:
   assuming that for each time stage of the stimulation treatment a velocity field for the at least one material transport and a stimulated flow domain geometry are known; and
   calculating at each time stage the distribution of at least one physical quantity of the at least one material transport using a Lagrangian approach;
   determining and preparing the treatment design; and
   performing the stimulating treatment according to the selected treatment design.

2. The method of claim 1, wherein the stimulation treatment is selected from the group of hydraulic fracturing with and without pulsing injection of materials transport, acidic fracturing and acidizing treatments.

3. The method of claim 1, wherein the input data is selected from the group of well completion and reservoir data for the subterranean formation including formation layer geomechanical properties, pumping schedule data, proppant materials data, fluids to be pumped data, target productivity index of the well data and combinations thereof.

4. The method of claim 1, wherein the at least one material transport is selected from the group of fluids, proppant materials, fibers, acids, viscosifiers, breakers, friction reducers, gases for energized fluids and combinations of thereof.

5. The method of claim 1, wherein the Lagrangian approach is selected from the group of particle-in-cell algorithms with different shape functions, methods of characteristics and combinations of thereof.

6. The method of claim 1, wherein the at least one physical quantity of a material transport selected from the group of concentration, mass, volume, electric charge, amount of substance of a material transport present in a stimulation treatment design.

7. The method of claim 1, wherein simulating a transport of at least two materials transport is performed simultaneously, successively or in any other sequence.

8. The method of claim 1, wherein determining the treatment design comprises of selection of materials transport, pumping times and materials transport concentration for each time stage of the treatment.

9. The method of claim 1, further comprising:
   calculating a conductivity distribution using a simulated materials transport distribution;
   obtaining a forecast for a wellbore productivity; and
   optimizing the wellbore productivity by modifying the stimulation treatment design.

10. A method for forecasting of materials transport distribution during and after stimulating a subterranean formation, comprising:
    acquiring stimulation treatment input data;
    simulating a transport of at least one material transport present in a stimulation treatment design with a transport simulator model, wherein simulating comprises:
    assuming that for each time stage of the stimulation treatment a velocity field for at least one material transport and a stimulated flow domain geometry are known; and
    calculating at each time stage the distribution of at least one physical quantity of the at least one material transport using a Lagrangian approach; and
    outputting of simulation data.

11. The method of claim 10, wherein the Lagrangian approach is selected from the group of particle-in-cell algorithms with different shape functions, methods of characteristics, and combinations of thereof.

12. The method of claim 10, wherein outputting of simulation data is carried out for distributions of physical quantities during and after the stimulation treatment of the subterranean formation.

13. The method of claim 10, further comprising:
    calculating a conductivity distribution using the simulated materials transport distribution;
    obtaining a forecast for a wellbore productivity; and
    optimizing the wellbore productivity by modifying the stimulation treatment design.

* * * * *